(12) United States Patent
Suzuki

(10) Patent No.: US 6,798,161 B2
(45) Date of Patent: Sep. 28, 2004

(54) MOTOR CONTROL DEVICE

(75) Inventor: Hiroshi Suzuki, Okazaki (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/423,494

(22) Filed: Apr. 25, 2003

(65) Prior Publication Data

US 2004/0027083 A1 Feb. 12, 2004

(30) Foreign Application Priority Data

Apr. 26, 2002 (JP) ........................................ 2002-126962

(51) Int. Cl.$^7$ ................................................ H02P 7/00
(52) U.S. Cl. ....................... 318/434; 318/139; 318/254; 318/432; 180/446; 180/443; 701/43; 701/41
(58) Field of Search ................. 318/139, 254, 318/432, 434; 180/443, 446; 701/41, 42, 43

(56) References Cited

U.S. PATENT DOCUMENTS

| 5,093,771 | A | | 3/1992 | Harvest | |
|---|---|---|---|---|---|
| 5,319,291 | A | | 6/1994 | Ramirez | |
| 5,350,988 | A | | 9/1994 | Le | |
| 5,602,735 | A | * | 2/1997 | Wada | 701/41 |
| 5,701,066 | A | * | 12/1997 | Matsuura et al. | 318/808 |
| 5,828,973 | A | * | 10/1998 | Takeuchi et al. | 701/41 |
| 5,889,376 | A | * | 3/1999 | Takatsuka et al. | 318/434 |
| 5,912,539 | A | * | 6/1999 | Sugitani et al. | 318/434 |
| 5,927,430 | A | * | 7/1999 | Mukai et al. | 180/446 |
| 6,226,580 | B1 | * | 5/2001 | Noro et al. | 701/42 |
| 6,335,604 | B1 | * | 1/2002 | Kataoka | 318/609 |
| 6,459,972 | B2 | * | 10/2002 | Kodaka et al. | 701/43 |
| 6,504,336 | B2 | * | 1/2003 | Sakamaki | 318/727 |
| 6,513,619 | B2 | * | 2/2003 | Amakusa et al. | 180/404 |
| 2001/0005121 | A1 | * | 6/2001 | Sakamaki | 318/727 |
| 2001/0053952 | A1 | * | 12/2001 | Kodaka et al. | 701/43 |
| 2002/0023798 | A1 | * | 2/2002 | Amakusa et al. | 180/446 |
| 2002/0089321 | A1 | | 7/2002 | Matsuda | |
| 2003/0117097 | A1 | * | 6/2003 | Iwata et al. | 318/432 |

FOREIGN PATENT DOCUMENTS

| JP | 8-113151 | * | 5/1996 |
|---|---|---|---|
| JP | 2000-2999928 | * | 10/2000 |

* cited by examiner

Primary Examiner—Paul Ip
(74) Attorney, Agent, or Firm—Darby & Darby

(57) ABSTRACT

The object of the present invention is to provide a motor control device capable of optimizing by actively controlling dead time even if FET characteristics change due to changes over time or the like. In a motor control device 20, a motor drive device 24 is disposed for U-, V-, and W-phases. High-stage FETs 81U, 81V, 81W and low-stage FETs 82U, 82V, 82W are disposed in series and are turned on in an exclusive manner. Connection points 83U, 83V, 83W are disposed therebetween and send drive currents to the phases of a brushless DC motor 6. Shunt resistors RU, RV, RW are inserted in the circuit to detect current for each of the phases. Through-current is monitored to optimize dead time and perform efficient and responsive motor control. The CPU 21 monitors current values detected during dead time. If an irregularity is detected, the dead time is increased to prevent through-current.

17 Claims, 8 Drawing Sheets

# MOTOR CONTROL DEVICE

BACKGROUND OF THE INVENTION

The present invention relates to a motor control device for three-phase brushless DC motors used in assist motors in electric power steering devices. More specifically, the present invention relates to a motor control device that sets a dead time value actively so that dead time is minimized in order to improve the motor's power supply usage efficiency, the controllability, and to reduce noise.

Three-phase brushless motors (hereinafter referred to as motors) with U-, V-, and W-phases that are easy to control and provide high torque relatively quickly are used, e.g., as assist motors in electric power steering devices. A control device for this type of motor is equipped with a transistor inverter having switching means formed from power MOS-FETs (Metal Oxide Semiconductor Field Effect Transistor) in a motor drive device. This motor drive device is formed with high-level and low-stage FETs for each of the U-, V-, and W- phases. The FETs are switched on in an alternating manner by the motor control device, which is equipped with a CPU, thus improving power supply usage efficiency and also providing smooth drive. However, if both a high-level FET and a low-stage FET are on at the same time for some reason, a through current flows through the high-level FET and the low-stage FET for that phase without flowing through the motor, resulting in a circuit that goes directly from the power supply to a ground GRD. Since the current does not pass through the coils of the motor, which have a high resistance, the resistance is low and the current is high, leading to damage to the FETs. Therefore, when a FET is to be turned on, a delay circuit is used to provide dead time so that a predetermined time elapses after the other FET is turned off before the FET is turned on, thus protecting the FETs.

However, two similar power MOSFETs can have varying characteristics. The differing characteristics can be response time and signal rise time and the like. To take all possibilities into account by providing leeway with a high dead time results in reduced power supply usage efficiency as well as contributing to non-linearity in the motor drive signal, which can lead to torque ripple that makes operation difficult and noise.

Dead time correction is one approach to correcting non-linearity caused by dead time. Although this involves complex operations, the processing is static and therefore cannot respond appropriately to changes over time and temperature changes.

OBJECTS AND SUMMARY OF THE INVENTION

In order to overcome these problems, the object of the present invention is to provide a motor control device that allows quick discovery of through-current during dead time even if, besides static tolerances such as production variations between switching means, there are differences caused by dynamic changes such as temperature changes and changes over time. Another object of the present invention is to provide a motor control device in which dead time is set in an active manner to minimize dead time and non-linearity caused by variations in switching means characteristics are minimized to improve motor efficiency and responsiveness while reducing noise.

A motor control device according to claim 1 includes: high-stage FETs disposed on a power-supply side and low-stage FETs disposed on a ground side, the FETs being switching means connected in series in circuits disposed between an application point of a power supply and a ground point and associated with U-, V-, and W-phases of a brushless DC motor, the FETs being selected in an exclusive manner; connection points disposed between the high-level FETs and the low-stage FETs supplying drive currents to U-, V-, and W-phase motor coils based on combinations of open/close states of the high-level FETs and the low-stage FETs for each phase; current detecting means detecting currents in the circuits; and switch controlling means controlling switching means and driving the brushless DC motor. Means for detecting irregular current detecting current at a predetermined timing using current detecting means. Means for evaluating motor drive circuit irregularities evaluates motor drive circuit irregularities based on current values detected by irregular current detecting means.

In a motor control device according to this structure, irregularities in the motor drive circuit are detected immediately by motor drive circuit irregularity evaluating means based on the current value detected by irregular current detecting means.

In addition to the structure of the motor control device described in claim 1, the motor control device according to claim 2 also includes correcting means correcting a dead time setting based on a current value detected by irregular current detecting means.

In addition to the operations provided by the motor control device described in claim 1, this motor control device uses correcting means to correct dead time settings based on a current value detected by irregular current detecting means when motor drive circuit irregularity evaluating means detects and irregularity.

In addition to the structure of the motor control device described in claim 1, in the motor control device according to claim 3, irregular current detecting means detects a trailing edge when a gate signal for the U-, V-, or W-phase goes from on to off or a leading edge going from off to on and detects through-current during a dead time for each phase with current detecting means using this timing as a reference.

In addition to the operations provided by the motor control device described in claim 1, this motor control device detects a trailing edge when a gate signal for the U-, V-, or W-phase goes from on to off or a leading edge going from off to on. Through-current is checked at a timing appropriate for each phase, thus allowing precise control.

In addition to the structure of the motor control device described in claim 1, in the motor control device according to claim 4, current detecting means is disposed so that current flowing through the low-stage FETs is detected. Irregular current detecting means detects when controlling means is sending "on" gate signals to U-, V-, and W-phase high-stage FETs while sending "off" gate signals to all low-stage FETs and detects through-current in the phases at this timing using current detecting means.

In addition to the operations provided by the motor control device described in claim 1, this motor control device checks for through-current when U-, V-, W-phase low-stage FET gate signals are all off. Thus, irregularities can be detected by performing current detection on just one position, allowing a simple structure.

In addition to the structure of the motor control device described in claim 1, in the motor control device according to claim 5, current detecting means is disposed so that current flowing through the low-stage FETs is detected.

Irregular current detecting means detects when controlling means is sending "on" gate signals to U-, V-, and W-phase low-stage FETs while sending "off" gate signals to all high-stage FETs and detects through-current in the phases at this timing using current detecting means.

In addition to the operations provided by the motor control device described in claim 1, this motor control device checks for through-current when U-, V-, W-phase high-stage FET gate signals are all off. Thus, irregularities can be detected by performing current detection on just one position, allowing a simple structure.

In addition to the structure of the motor control device described in claim 2 or claim 3, in the motor control device according to claim 6 correcting means reduces by a predetermined amount a dead time setting set up based on a turn-off dead time and a turn-on dead time set up ahead of time if a predetermined through-current is not detected by irregular current detecting means. If the predetermined through-current is detected, the correcting means increases the dead time by a predetermined amount.

In addition to the operations provided by the motor control device described in claim 2 or claim 3, this motor control device can reduce dead time if no through-current is flowing. This allows power supply usage to be improved and torque ripple and noise to be reduced. If through-current is flowing, the turn-off dead time and the turn-on dead time are reset to extend the dead time so that the FETs can be safely protected.

In addition to the structure of the motor control device described in claim 6, in the motor control device according to claim 7, if the through current is detected at a predetermined dead time value, correcting means does not reduce the dead time below the dead time value at which the through-current was detected.

In addition to the operations provided by the motor control device described in claim 6, when a through-current is detected at a predetermined dead time setting, correcting means does not reduce the setting below the dead time setting at which the through-current was detected. This safely protects the FETs.

In addition to the structure of the motor control device described in claim 6 or claim 7, in the motor control device according to claim 8 controlling means sets dead time values independently for each of the phases.

In addition to the operations provided by the motor control device described in claim 6 or claim 7, dead time is set independently for each phase. Thus, optimal settings that correspond to variations in individual FETs can be provided.

In addition to the structure of the motor control device described in any one of claim 6 through claim 8, in the motor control device according to claim 9, correcting means sets the dead time setting value independently of turn-off dead time and turn-on dead time.

In addition to the operations provided by the motor control device described in any one of claim 6 through claim 8, the dead time is set independently for the turn-off dead time and the turn-on dead time. Thus, optimal settings corresponding to variations in individual FETs can be provided.

The above, and other objects, features and advantages of the present invention will become apparent from the following description read in conjunction with the accompanying drawings, in which like reference numerals designate the same elements.

[List of designators]

B: power supply;
GRD: ground;
P: application point;
Q, 83U, 83V, 83W: connection point;
AU, AV, AW: operational amplifier;
RU, RV, RW: shunt resistor;
t1, t2, tu, tv, tw: timing;
td: dead time;
DT: dead time;
DTmin: minimum dead time setting;
Id, Ie, $I_0$: current value;
Iu, Iv, Iw: current;
6: motor;
20: motor control device;
21: CPU;
24: motor drive device serving as motor drive circuit;
81U, 81V, 81W: high-level FET serving as switching means;
82U, 82V, 82W: low-stage FET serving as switching means

DETAILED DESCRIPTION OF THE PREFERRED EMBODIMENTS (First Embodiment)

Referring to FIG. 1 through FIG. 6, a first embodiment of the present invention will be described in the form of a motor control device 20 in an electric power steering device. The motor control device 20 is equipped with motor drive circuit irregularity evaluating means.

Figure 1:
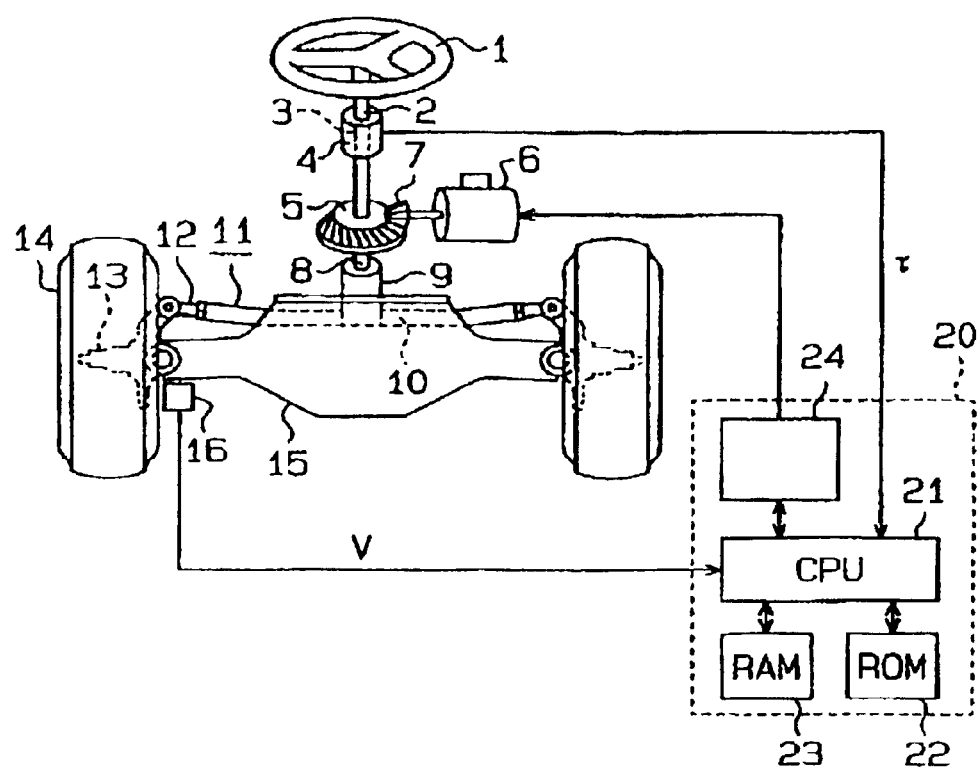
FIG. 1 is a simplified drawing of an electric power steering device.

FIG. 1 shows a simplified drawing of an electric power steering device. A torsion bar 3 is disposed on a steering shaft 2 connected to a steering wheel 1. This torsion bar 3 is equipped with a torque sensor 4. When the steering shaft 2 is turned and force is applied to the torsion bar 3, the torsion bar 3 is twisted in response to the applied force. This twisting, i.e., a steering torque τ applied to the steering wheel 1, is detected by the torque sensor 4.

A reduction gear 5 is secured to the steering shaft 2. This reduction gear 5 is meshed against a gear 7 attached to the rotation shaft of a brushless DC motor (hereinafter referred to as a motor 6), which serves as the electric motor. This motor 6 is formed as a three-phase synchronous permanent magnet motor.

Figure 3:
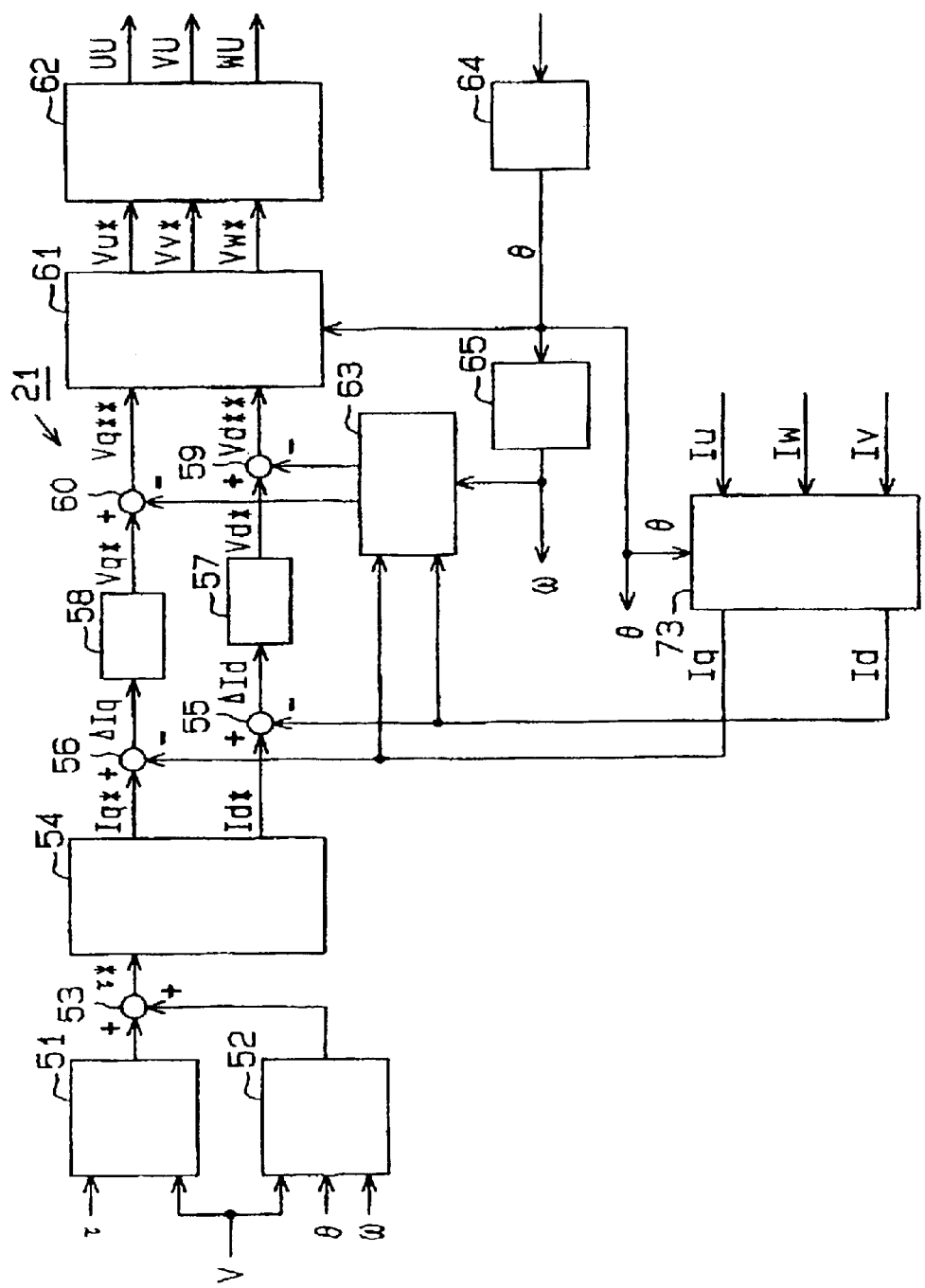
FIG. 3 is a control block diagram showing functions executed by a program in a CPU 21.

A rotation angle sensor 30 formed with an encoder for detecting the rotation angle of the motor 6 is disposed on the motor 6 (see FIG. 3). The rotation angle sensor outputs a zero phase pulse series signal that is shifted π/2 from the rotation of the rotor of the motor 6 and a zero-phase pulse series signal representing the reference rotation position.

A pinion shaft 8 is secured to the reduction gear 5. The end of the pinion shaft 8 is secured to a pinion 9, and this pinion 9 meshes with a rack 10. Tie rods 12 are secured to the ends of the rack 10, and knuckles 13 are rotatably connected to the ends of the tie rods 12. Front wheels 14, in the form of tires, are secured to the knuckles 13. Also, one end of the knuckle 13 is rotatably connected to the cross member 15.

Thus, when the motor 6 rotates, the number of rotations is reduced by the reduction gear 5 and transferred to the pinion shaft 8. The rotation is then transferred to the rack 10 by way of the pinion and the rack mechanism 11. Then, the rack 10 can use the tie rod 12 to change the direction of the vehicle by changing the orientation of the front wheels 14 disposed on the knuckles 13.

A car speed sensor 16 is disposed on the front wheel 14. This car speed sensor 16 sends the current car speed to a CPU 21 in the motor control device 20 by way of an interface. This is done by sending a pulse signal having a period corresponding to the rotation count of the front wheel 14. Also, the torque sensor 4 sends a voltage corresponding to the steering torque τ of the steering wheel 1 to the CPU 21 by way of an interface. The motor control device 20 controls the motor 6 by sending it a drive signal based on signals from the car speed sensor 16 and the torque sensor 4.

Next, the electronic structure of the motor control device 20 will be described. The motor control device 20 is equipped with: the CPU 21, a ROM 22, a RAM 23, and a motor drive device 24 including a power supply supplying drive current to U-, V-, and W-phases, an inverter, and switching means. This motor control device 20 corresponds to switch controlling means of the present invention. The ROM 22 stores a control program for having the CPU 21 perform calculation operations, data needed for calculations, and the like. Also, a basic assist map is also stored in the ROM 21. The basic assist map corresponds to the steering torque τ (rotation torque) and is used to determine a basic assist current corresponding to a car speed. The basic assist map stores basic assist currents associated with steering torques τ. The RAM 23 temporarily stores the calculation results from calculation operations performed by the CPU 21, measurement values, a dead time DT determined from a turn-off dead time and a turn-on dead time, a dead time minimum value DTmin, and the like. In this embodiment, the ROM 21 is formed from writable storing means, e.g., an EEPROM. This allows the dead time DT and the dead time minimum value DTmin to be saved even if the power is turned off.

Figure 2:
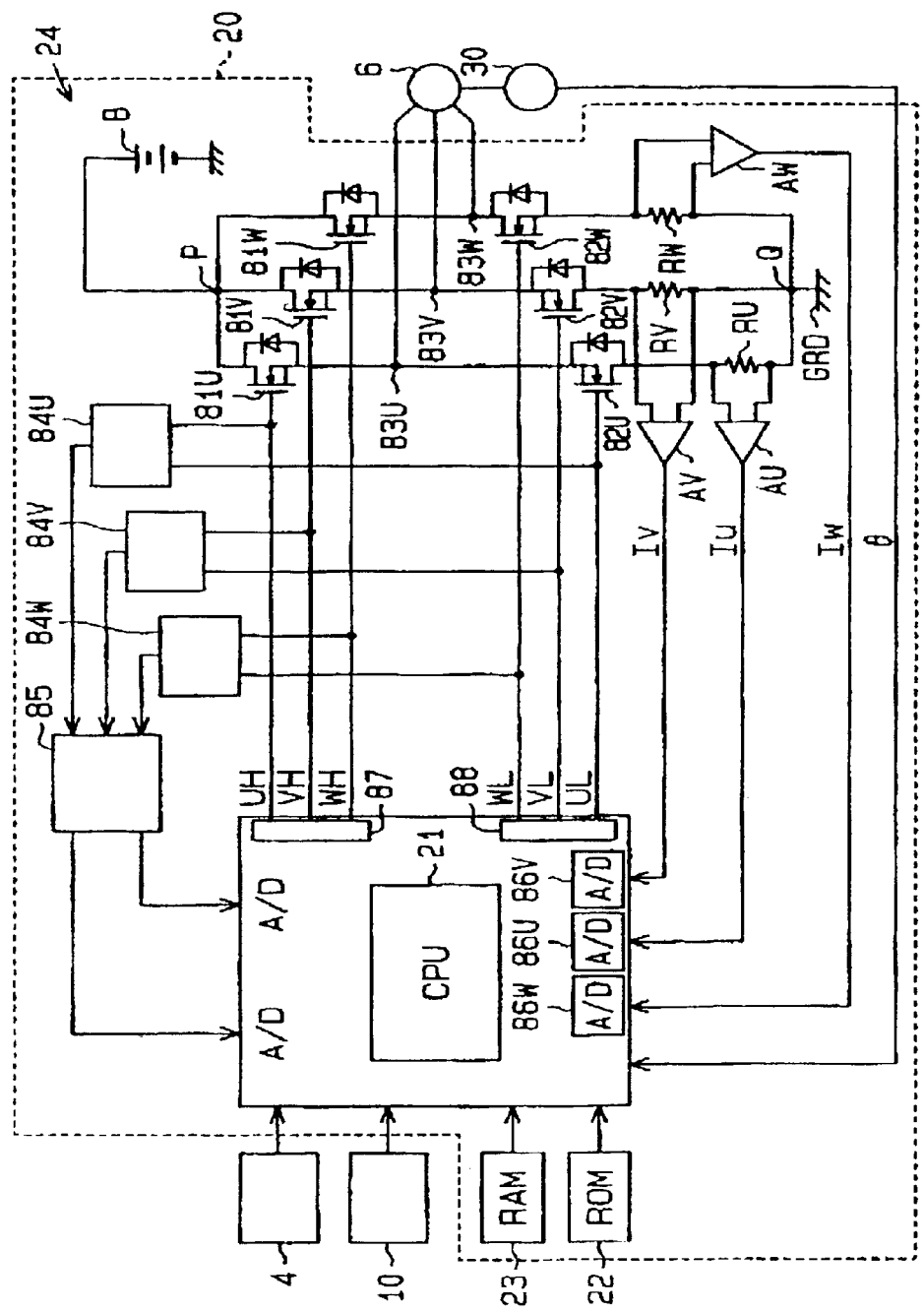
FIG. 2 is a detailed drawing of a motor control device 20 shown in FIG. 1.

FIG. 2 is a detailed drawing of the motor control device 20 shown in FIG. 1. The motor control device 20 will be described in further detail. The main elements of the motor control device 20 are the CPU 21, which performs calculations, and the motor drive device 24, which supplies power to the motor 6.

The motor drive device 24 is formed from the sections of FIG. 2 excluding the CPU21, the ROM 22, and the RAM 23 of the motor control device 20. As shown in FIG. 2, the motor drive device 24 includes a transistor inverter formed from power MOSFET (Metal Oxide Semiconductor Field Effect Transistor) serving as switching means. Parasitic diodes are generated in these FETs. These diodes function as flywheel diodes that absorb counterelectromotive force connected in parallel to coils. The series circuit of the FET 81U and the FET 82U, which corresponds to the U phase, the series circuit of the FET 81W and the FET 82W, which corresponds to the V phase, and the series circuit of the FET 81W and the FET 82W, which corresponds to the W phase, are connected in parallel.

The voltage from a power supply B, in the form of a DC12V battery mounted in the vehicle, is applied to a drain-side point P of the FET 81U, the FET 81V, and the FET 81W of the series circuits. The source terminals of the FET 82U, the FET 82V, and the FET 82W come together at connection point Q which is connected to a ground GRD.

In this embodiment, the U-phase, V-phase, and W-phase power-supply side FET 81U, FET 81V, and FET 81W are referred to as "upper-stage FETs". The ground-side FET 82U, FET 82W, and FET 82W are referred to as "lower-stage FETs".

A connection point 83U between the FET 81U and the FET 82U is connected to a U-phase coil of the motor 6. A connection point 83V between the FET 81V and the FET 82V is connected to a V-phase coil of the motor 6. A connection point 83W between the FET 81W and the FET 82W is connected to a W-phase coil of the motor 6.

Shunt resistors RU, RV, and RW are respectively inserted between the FET 82U, the FET 82V, and the FET 82W of the lower-stage FETs and the connection point Q connected to the ground GRD. Differential input terminals of operational amps AU, AV, AW are connected to the terminals of the shunt resistors RU, RV, RW. The power-supply sides of the shunt resistors RU, RV, RW are connected to the noninverted input terminals of the operational amps AU, AV, AW, and the ground sides of the shunt resistors RU, RV, RW are connected to the inverted input terminals of the operational amps AU, AV, AW respectively. The shunt resistors RU, RV, RW have very small resistances that do not affect motor drive. Thus, when current flows through the shunt resistors RU, RV, RW, a slight potential difference is generated between the terminals. These potential differences are amplified by the operational amps AU, AV, AW respectively, and these are digitized by A/D converters 86U, 86V, 86W. Based on this, the CPU 21 calculates the currents flowing through the shunt resistors RU, RV, RW.

Figure 5:
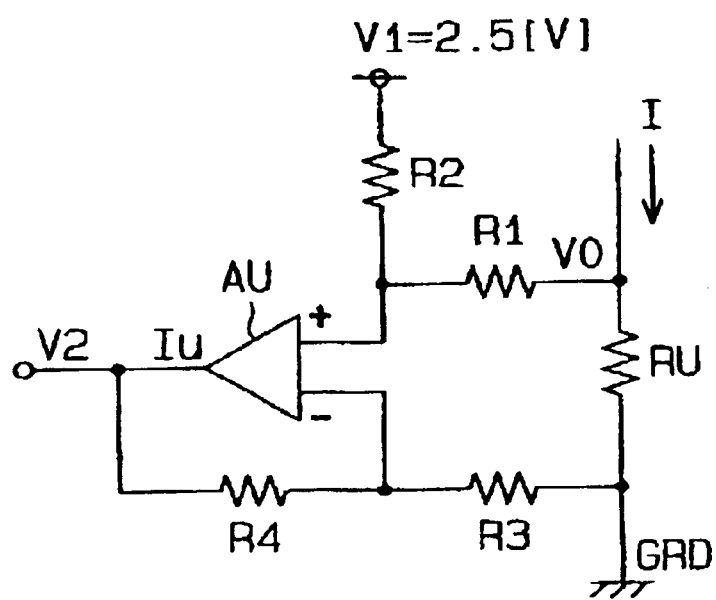
FIG. 5 is a detailed drawing of an amplifier circuit.

FIG. 5 shows a detailed drawing of an amplifier circuit. The same amplifier circuit is used for each phase, so the U-phase circuit will be described here. In this amplifier circuit, a differential amplifier is formed using the differential input type operational amp AU. Since current flows bi-directionally in all phases, the amplifier circuit is supplied with +2.5 volts to serve as a reference voltage V1 via a resistor R2. A power-supply side V0 of the U-phase circuit shunt resistor RU is connected to the noninverted input terminal + operational amp AU via a resistor R1. Also, the ground GRD of the shunt resistor RU is connected to the inverted input terminal − of the operational amp via a resistor R3. Also, a negative feedback resistor R4 is connected to the inverted input terminal − and the output terminal. In this circuit, R1=R3 and R2=R4. Thus, the amplification factor G is determined by R4/R3. These are formed as "shunt ammeters", and correspond to current detecting means of the present invention.

The shunt resistors RU, RV, RW of current detecting means do not have to be disposed between the lower-stage FETs and the ground GRD. The design can be modified so that the shunt resistors are disposed between the upper-stage FETs and the power-supply B or the like. Furthermore, current detecting means does not have to be formed from a shunt ammeter. Another structure can be used as long as it can directly or indirectly detect current.

The CPU 21 is connected via a high-stage drive circuit 87 to the gates of the FET 81U, the FET 81V, and the FET 81W, i.e., the upper-stage FETs. Also, PWM control signals UU, VU, WU (the PWM control signal for a phase includes a PWM wave signal and a signal indicating the rotation direction for the motor 6) are received from the CPU 21.

The motor drive device 24, formed as a transistor inverter, generates three-phase excitation currents corresponding to the PWM control signals UU, VU, WU, and these are sent to the motor 6 via a three-phase excitation current path.

Figure 4:
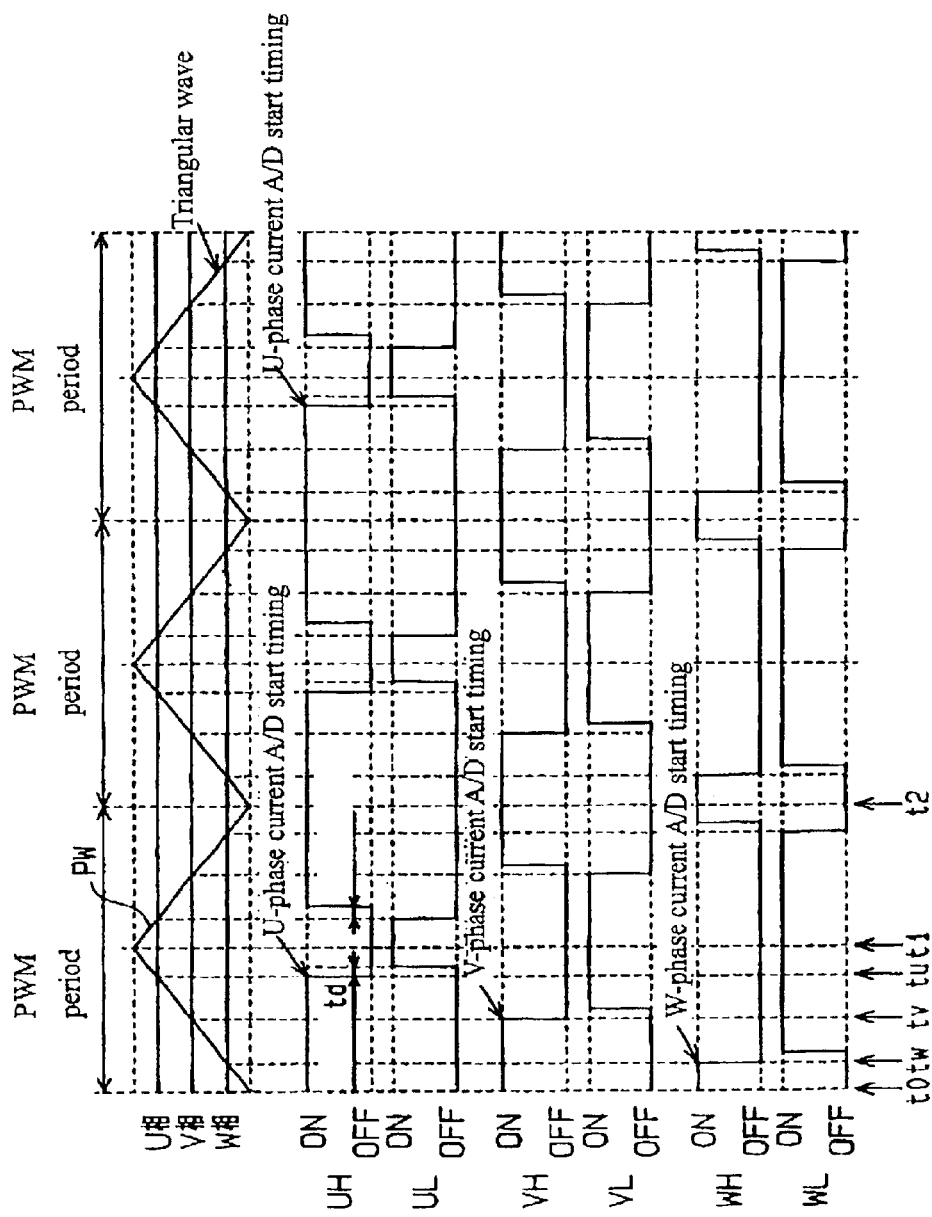
FIG. 4 is a timing chart illustrating the timing at which a CPU 21 switches U-, V-, W-phase high-level FETs and low-stage FETs.

FIG. 4 shows a timing chart illustrating the timing of gate signals, which are control signals from the CPU 21 for the switching of the U-, V-, and W-phase high-stage and low-stage FRTs. As shown at the top of FIG. 4, a triangular wave PW is generated to serve as the PWM period. Switching timing is determined based on threshold levels corresponding to the U-phase, the V-phase, and the W-phase. More specifically, when the triangular wave PW reaches a phase threshold level, switching takes place from high-stage FET to low-stage FET. Also, if a value drops below a threshold level, switching takes place back from low-stage FET to high-stage FET.

If the high-stage FET and the low-stage FET for the same phase are on at the same time, a "through-current" flows directly from the power supply B through the high-stage FET and the low-stage FET for the phase to the ground GRD without passing through the motor 6. Since the current does not pass through the high-resistance coils of the motor 6, the resistance of the circuit is low and a high current can flow. This can lead to damage to the high-stage FET and the low-stage FET. Therefore, to prevent through-currents, a dead time td is provided in the timing of the low-stage FET 82W using a delay circuit.

Even if there is no gate signal from the CPU 21, a through-current can also take place if there is poor insulation due to a malfunction in an FET. In these cases, unlike bad dead time settings, a very small current may flow during the initial stage of the malfunction. Since this can also lead to further malfunctions, e.g., in other FETs, as well as significant control failures, the problem must be discovered and corrected quickly.

The timing chart in FIG. 4 shows the control on/off signals (gate signals) for the upper-stage drive circuit 87 or the lower-stage drive circuit 88. The actions of the drive circuit 88 and the FETs are delayed by switching delays from the gate signals. The turn-off dead time $td_{off}$ indicated here refers to the interval between when one of the FETs is turned off by a gate signal and when the current flowing through the FET is turned off. This time is the beginning of dead time. The turn-on dead time $td_{on}$ refers to the interval between when one of the FETs is turned on by a gate signal and when current through the FET is turned on. This time marks the end of dead time. Both of these are triggered by the gate signal. Thus, the dead time td would, theoretically, be the sum of the turn-off dead time $td_{off}$ and the turn-on dead time $td_{on}$. However, there can be various types of variations that affect the actual dead time td, so gate signal timings are set up with a margin in addition to these time lags. Thus, the dead time td must be an interval that provides a predetermined amount of leeway rather than simply providing non-overlapping intervals.

This predetermined dead time td can vary depending on the switching delay status and can also change. More specifically, the time can change depending on the characteristics of the FET itself, variations between parts, temperature changes, changes over time, the effect of noise, and the like. Therefore, in order to be safe and avoid through-current through the FETs of all phases, the conventional technology used uniform fixed-interval with adequate margins for turn-off dead time $td_{off}$ and turn-on dead time $td_{on}$ settings. While the dead time td is a necessary and unavoidable interval, including a margin that is greater than needed can reduce power supply usage and lead to torque ripple and noise. Thus, it would be preferable to keep the interval as short as possible.

The timing at which control signals are sent to the FETs will be described using FIG. 4. Referring to the top of FIG. 4, at time t0, the initial state, the triangular wave PW has not reached the threshold levels of U, V, W. Thus, the high-level FETs are turned on and the low-stage FETs are turned off. At this point in time, the circuit shown in FIG. 2 going from the power supply B to the ground GRD is not closed. At this initial timing, no counterelectromotive force due to inductance of the motor coil is generated. At time t2, even though this is another valley in the triangular wave, the motor 6 is rotating. Thus, even if there is no power being supplied by the power supply B to the motor 6, a switch-off will result in current flowing due to the counterelectromotive force generated by the coil of the motor 6.

At this point, current generated by the U-phase coil of the motor, not shown in the figure, will, for example, split between the V-phase and the W-phase within the motor 6. The current passing through the V-phase connection point 83V will flow from the high-level FET 81V to the connection point P, and the current passing through the W-phase connection point 83W will flow from the high-level FET 81U to the connection point P. These currents combine at the connection point P and go from the high-stage FET 81U of the U phase to the U phase of the motor 6 by way of the connection point 83U.

In the case of time t2, the current flows through the high-level FETs 81U, 81V, 81W and does not flow through the shunt resistors RU, RV, Rw. Thus, there is no potential difference between the terminals of the shunt resistors RU, RV, RW.

Next, when the triangular wave PW goes from tw to a level associated with the W phase, a control signal WH stops and the high-level W-phase FET 81W is turned off. Next, after the dead time td elapses, a control signal WL is sent and the low-stage W-phase FET 82W is turned on. The dead time td will be described in further detail. When the control signal WH is stopped according to a pre-set timing, the turn-off dead time $td_{off}$ triggered by the high-level W-phase FET 81W. A predetermined margin is provided and the control signal WL is sent to the FET 82W at a timing calculated ahead of time based on the turn-on dead time $td_{on}$ from the W phase low-stage FET 82W. In this manner, the dead time td is based on the turn-off dead time $td_{off}$ determined by when the control signal WH is sent and the turn-on dead time $td_{on}$ determined by when the control signal WL is sent. The timing at which the control signals WH, WL are sent is determined by data stored in the ROM 22 and the RAM 23 of the CPU 21 using the triangular wave PW as a reference.

When the W-phase low-stage FET 82W is turned on in place of the W-phase high-stage FET 81W, the voltage applied from the power supply B causes current to flow through the U-phase high-stage FET 81U and the V-phase high-stage FET 81V, which are turned on, but current does not flow through the W-phase high-stage FET 81W, which is turned off, since the circuit is open. The currents flowing to the motor 6 through the connection points 83U, 83V come together in the motor 6. The current is then output from the connection point 83W and pass from the low-stage FET 82W that has been turned on through the shunt resistor RW and to the ground GRD. As a result, the operational amp AW receives the potential between the terminals of the shunt resistor RW, and the difference is amplified and output to the A/D converter 86W. The value digitized by the A/D converter 86W is sent to the CPU 21 and a current value is calculated.

Since the dead time td is monitored, the A/D converter 86W detects when the control signal WL is off at the timing tw when the triangular wave PW reaches the W phase level. Then, the edge detection circuit 84W detects the trailing edge of the control signal WH. When the trailing edge of the control signal WH is detected in this manner, an A/D trigger generation circuit 85 generates an A/D trigger signal and an A/D channel selection signal. These are sent by way of the interface to the CPU 21, and the A/D converter 86W immediately begins sampling the channel (phase).

Similarly, at the timing tv when the triangular wave PW reaches the V-phase level, the V-phase high-level FET 81V is turned off. After the dead time td has elapsed, just the U-phase high-level FET 81U is turned on, while the V-phase and W-phase FETs 82V, 82W are turned on at the lower level. In this state, current flows through the shunt resistors RV, RW so that the V-phase and W-phase currents can be detected.

At the timing tu when the triangular wave PW reaches the U-phase level, the U-phase high-level FET 81U is turned off. After the dead time td has elapsed, all the high-level FETs are off, and the U-phase, V-phase, and W-phase low-stage FETs 82U, 82V, 82W are turned on. During an interval from timing tw to timing t1 at a peak of the triangular wave PW, the current can, for example, flow from a U-phase coil not shown in the figure and branch to the V-phase and W-phase coils in the motor 6. The currents can then pass from the connection points 83V, 83W to the low-stage FET 82V, 82W and go through the shunt resistors Rv, RW. The V-phase and W-phase currents come together at the connection point Q on the GRD side, and the resulting current passes through the U-phase shunt resistor RU and the low-stage FET 82U and returns back to the U-phase coil from the connection point 83U. Thus, in this case, the shunt resistors RU, RV, RW can detect the U-phase, V-phase, and W-phase currents. In this case, the current flowing to the shunt resistor RU is equal to the sum of the currents flowing through the shunt resistors RV, RW.

More specifically, at the timing t1 at the peak of the triangular wave PW, current flows through the shunt resistors RU, RV, RW, while at the timing t2 at the valley of the triangular wave PW, current flows through none of shunt resistors RU, RV, RW.

After a predetermined interval, the triangular wave PW drops below a level corresponding to the U-phase, turning the U-phase low-stage FET 81U off. Then, after the predetermined dead time td, the U-phase high-level FET 81U is turned on. Next, when the triangular wave PW drops below a level corresponding to the V-phase, the V-phase low-stage FET 82V is turned off, and, after the predetermined dead time td, the V-phase high-level FET 81V is turned on. When the triangular wave PW drops below a level corresponding to the W phase, the W-phase low-stage FET 82W is turned off, and, after the predetermined dead time td, the W-phase high-level FET 81W is turned on. In this manner, the timing at which control signals are sent to the individual FETs is controlled by the PWM period of the triangular wave PW.

The edge detection circuit 84U shown in FIG. 2 detects the leading edge of the control signal UH when the control signal UL is off. Similarly, the edge detection circuit 84V detects the leading edge of the control signal VH when the control signal VL is off, and the edge detection circuit 84W detects the leading edge of the control signal WH when the control signal WL is off. When edges are detected in this manner, the A/D trigger generation circuit 85 generates an A/D trigger signal and an A/D channel selection signal, which are sent by way of the interface to the CPU 21.

FIG. 3 is a control block diagram showing the functions executed by a program in the CPU 21. The functions of the electric power steering device will be described using FIG. 3. The elements shown in the control block diagram do not represent independent hardware units and are conceptual illustrations of the functions executed by the CPU 21.

The CPU 21 of the motor control device 20 is equipped with a basic assist force calculating module 51, a restore force calculation module 52, and an adding module 53 for calculating an instruction torque $\tau^*$. The basic assist force calculation module 51 receives the car speed V detected from the car speed sensor 16 and the steering torque $\tau$ from the torque sensor 4. The basic assist force calculation module 51 calculates an assist torque that increases as the steering torque $\tau$ increases and that decreases as the car speed V increases.

The restore force calculating module 52 receives, along with the car speed V, an electrical angle $\theta$ of the rotor of the motor 6 (which corresponds to the rotation angle) and an angular velocity $\omega$. Based on these input values, the restore force calculating module 52 calculates a restore force for returning the steering shaft 2 to the basic position and a restore torque corresponding to the resistance force associated with rotation of the steering shaft 2. The adding module 53 calculates an instruction torque $\tau^*$ by adding the assist torque and the restore torque, and sends the result to an instruction current setting module 54.

The instruction current setting module 54 calculates 2-phase instruction currents Id* and Iq* based on the instruction torque $\tau^*$. The instruction currents Id*, Iq* correspond to the a d axis in the same direction to the permanent magnet and a q axis perpendicular thereto in a rotation coordinate system synchronized with rotating magnetic flux generated by the permanent magnet on the rotor of the motor 6. These instruction currents Id* and Iq* are referred to as the d-axis and q-axis instruction currents.

The d-axis instruction current Id* and the q-axis instruction current Iq* are sent to subtractors 55, 56. The subtractors 55, 56 calculate the differences ΔId, ΔIq between the d-axis instruction current Id* and the q-axis instruction current Iq* and the d-axis and q-axis detection currents Id, Iq respectively. The results are sent to PI control modules (proportional-plus-integral control modules) 57, 58.

Based on the differentials ΔId, ΔIq, the PI control modules 57, 58 calculate d-axis and q-axis instruction voltages Vd*, Vq* respectively so that the d-axis and the q-axis detection currents Id, Iq track the d-axis instruction current Id* and the q-axis instruction current Iq*.

The d-axis and the q-axis instruction voltages Vd*, Vq* are corrected by a noninteracting control correction value calculating module 63 and subtractors 59, 60 to d-axis and q-axis correction instruction voltages Vd, Vq, which are sent to a 2-phase/3-phase coordinate conversion module 61.

Using the d-axis and q-axis detection currents Id, Iq and the angular velocity $\omega$ of the rotor of the motor 6, the noninteracting control correction value calculating module 63 calculates the noninteracting control correction values $\omega \cdot La \cdot Iq$, $-\omega \cdot (\Phi a + La \cdot Id)$ for the d-axis and q-axis instruction voltages Vd*, Vq*. The inductance La and magnetic flux $\Phi a$ are constants determined beforehand.

The subtractors 59, 60 subtract the noninteracting control correction values from the d-axis and q-axis instruction voltages Vd*, Vq* respectively to calculate the d-axis and the q-axis correction instruction voltages Vd, Vq, which are sent to the 2-phase/3-phase coordinate conversion module 61. The 2-phase/3-phase coordinate conversion module 61 converts the d-axis and the q-axis correction instruction voltages Vd, Vq to 3-phase instruction voltages Vu*, Vv*, Vw*, and these converted 3-phase instruction voltages Vu*, Vv*, Vw* are sent to the PWM control module 62.

The PWM control module 62 converts these 3-phase instruction voltages Vu*, Vv*, Vw* to corresponding PWM control signals UU, VU, WU (these contain PWM wave signals and signals indicating the rotation direction of the motor 6). These are sent to the motor drive device 24, which is an inverter circuit.

Referring to FIG. 2, the potential differences detected between the terminals of the shunt resistors RU, RV, RW disposed between the 3-phase low-stage FETs and the ground GRD are amplified by the operational amps AU, AV, AW. Then, the A/D converters 86U, 86V, and 86W perform A/D conversion. The CPU 21 calculates current values and currents Iu, Iv, Iw are sent to a 3-phase/2-phase coordinate conversion module 73 shown in FIG. 3.

The 3-phase/2-phase coordinate conversion module 73 convert the 3-phase detected excitation currents Iu, Iv, Iw to 2-phase d-axis and q-axis detection currents Id, Iq, which are sent to the subtractors 55, 56 and the noninteracting control correction value calculating module 63.

A 2-phase pulse series signal and a 0-phase pulse series signal from the rotation angle sensor 30 are sent continuously at a predetermined sampling period to an electrical angle conversion module 64. The electrical angle conversion module 64 uses these pulse series signals to calculate an electrical angle θ corresponding to the stator of the motor 6. The calculated electrical angle θ is sent to an angular velocity conversion module 65. The angular velocity conversion module 65 takes the differential of the electrical angle θ and calculates the angular velocity ω of the rotor relative to the stator. The angular velocity ω indicates positive rotation of the rotor with a positive value and negative rotation of the rotor with a negative value.

Means for evaluating motor drive circuit irregularities according to the first embodiment will be described. The CPU 21 executing the procedures for evaluating motor drive circuit irregularities corresponds to means for evaluating motor drive circuit irregularities of the present invention.

Figure 6:
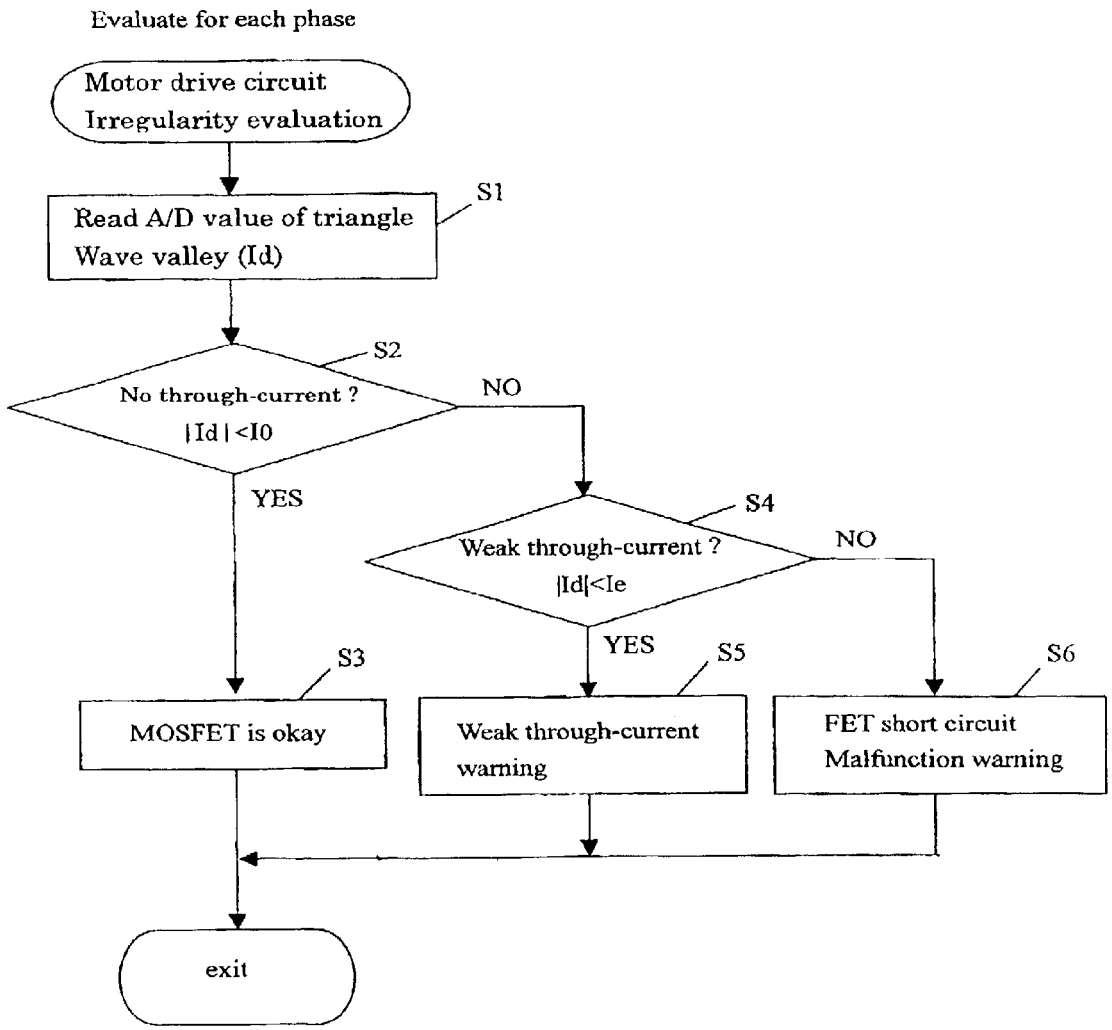
FIG. 6 is a flowchart showing a procedure for evaluating motor drive circuit irregularities performed by a CPU 21.

FIG. 6 is a flowchart illustrating the procedure for evaluating motor drive circuit irregularities. To facilitate the description, the U phase will be described here and the procedures for the other phases will be omitted since they are similar. First, at the timings t0, t2 or the like for the valleys of the triangular wave PW (see FIG. 4), the potential difference between the terminals of the shunt resistor RU is amplified by the operational amp AU. A/D conversion is performed by the A/D converter 86U (see FIG. 2), and the CPU 21 performs calculations. The resulting current value Id is read and stored in a predetermined region in the RAM 21 (S1). The absolute value of the current value Id is then compared with $I_0$, which is a predetermined threshold value stored ahead of time in the ROM 22 to determine whether an irregular current is flowing (S2).

In this case, since the current value Id flowing through the shunt resistor RU at the timings t0, t2 or the like for the valleys of the triangular wave PW (see FIG. 4) is read, the low-stage FETs should all be off and there should be no current flowing from the power supply B to the shunt resistor RU. However, if a low-stage FET is damaged because of a through-current or the like, resulting in bad insulation, a through-current may be present that is very weak compared to a through-current that would be generated due to a timing error. Furthermore, current may be circulating back through a diode or the like. Therefore, a comparison is made with the current value $I_0$ set up ahead of time as a threshold value used to evaluate whether a current is an irregular current or a normal current. Since the current value Id flows through the circuit in both direction, the absolute value $|Id|$ is compared with the current value $I_0$ to determine if it is a through-current. The CPU 21 that checks for irregular current at the predetermined timing corresponds to means for detecting irregular currents of the present invention.

If $|Id|<I_0$, it is assumed that there is no irregular current flowing through the U-phase circuit (S2: Yes), and the FET 81U and the FET 82U are handled as being normal (S3), and the operation is completed (exit).

Next, if the detected current value Id does not satisfy $|Id|<I_0$ (S2: No), it is assumed that there is an irregularity in the motor drive circuit. In order to determine if this irregularity is from a weak through-current or from a high current, the absolute value of the current value Id is compared with a current value Ie set up ahead of time in the ROM 22 (S4). If $|Id|<Ie$ (S4: Yes), the through-current is assumed to be weak. A warning indicating the presence of a weak through-current is displayed on displaying means, which serves as notifying means, not shown in the figures (S5). The operation is then completed (exit).

If it is not the case that $|Id|<Ie$ (S4: No), it is assumed that the through-current is not weak. Since there may be a short-circuit in a FET, a warning indicating an FET short-circuit is displayed on displaying means, which serves as notifying means, not shown in the figures (S6). The operation is then completed (exit).

The motor drive device 20 according to the first embodiment as described above provides the following characteristics.

The CPU 21, which serves as means for evaluating motor drive circuit irregularities, displays a warning on the display device if an irregular current is flowing. As a result, usage can be stopped immediately and measures can be taken such as fixing the malfunction.

In particular, it is possible to detect weak through-currents, which are difficult to detect. This allows measures to be taken before other FETs are damaged.

Furthermore, another advantage is that, if an irregularity is discovered, assist to the steering in the power steering device can be stopped.

This embodiment can also be implemented as follows.

Instead of or in addition to displaying with displaying means, assist to the steering in the power steering device can be stopped when an irregularity is detected.

Alternatively, a time and current value or the like can be recorded to recording means, e.g., an EEPROM, so that these values can be read and analyzed during a later maintenance session.

In the embodiment described above, the shunt resistors RU, RV, RW, which serve as current detecting means, are arranged so that current flowing downstream from the low-stage FETs is detected. Also, the CPU 21 uses current detecting means to check for through-currents in each of the phases when the gate signals for the U-, V-, and W-phase high-level FETs are all off and when the gate signals for all of the low-stage FETs are on. However, the predetermined timing used in the present invention is not restricted to this particular timing. For example, the edge detection circuits 84U, 84V, 84W can be used to detect a trailing edge when one of the U-, V-, or W-phase gate signals is changing from on to off. Using this timing as a reference, the CPU 21 can detect through currents independently for each phase. In this case, the dead times for each of the phases can be monitored directly, allowing more accurate evaluations.

The method of detecting current is not restricted to the use of the shunt resistors RU, RV, RW, e.g., detection can be performed using Hall devices. Also, the positions of these elements are not restricted as long as they can detect currents for the phases either directly or indirectly. Also, the currents for the three phases can be determined from two sensors.

Furthermore, a single current detecting means can be used rather than providing current detecting means for each phase. This arrangement still allows irregular currents to be detected.

(Second Embodiment)

Next, a second embodiment of the present invention will be described. In addition to the structure of the motor control device 20 of the first embodiment, the second embodiment uses a predetermined timing in which the dead time for each phase is monitored directly. Also, the irregular current detected by irregular current detecting means is through-current, and this embodiment also includes correcting means for actively correcting dead time settings based on the current values of these through-currents. More specifically, the CPU 21 serves as correcting means. If the current value Id detected by irregular current detecting means is not greater than the current value $I_0$, which is a predetermined through-current, a dead time DT set up ahead of time is reduced by $\Delta T0$. If a through-current is detected, the dead time DT is increased by $\Delta T1$. Since the hardware structure and basic operations are similar, only the procedures involved in correcting means will be described and other descriptions will be omitted.

Figure 7:
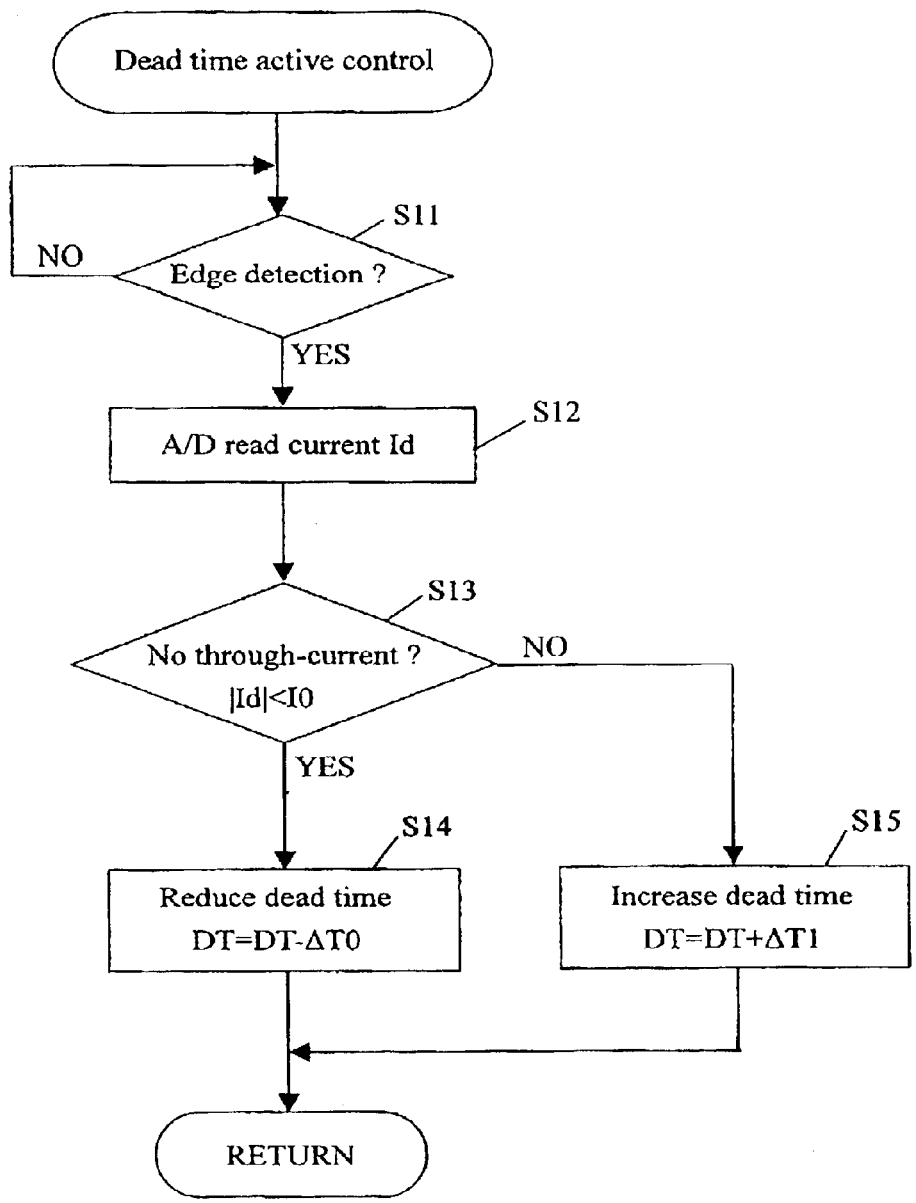
FIG. 7 is a flowchart showing a procedure for dead time active control performed by a CPU 21 serving as correcting means of a second embodiment.

FIG. 7 is a flowchart illustrating how the CPU 21, which serves as correcting means in the second embodiment, actively controls dead time. The active control of dead time will be described using this flowchart. Since the procedure is performed for each phase, the U phase will be described and the other phases will be omitted. First, the CPU 21 uses the edge detection circuit 84U to wait for the trailing edge of the control signal UH from the high-level drive circuit 87 (S11). The detection of the trailing edge of the control signal UH at the timing tu shown in FIG. 4 (S11: Yes) is the start of the dead time td, so the A/D value of the current Id flowing through the U-phase circuit at this point is read (S12). This reading is performed with the shunt resistor RU, the operational amp AU, and the A/D converter 86U, and the result is stored in a predetermined region in the RAM 23.

Next, the current value $I_0$, which is a reference current set up ahead of time is called up from the ROM 22 and compared with the absolute value of the current value Id stored in the RAM 23. If $|Id|<I_0$ (S13: Yes), there is no through-current, so dead time DT is reduced by the predetermined time $\Delta T0$ by setting DT=DT$-\Delta T0$(S14), and then the CPU 21 waits for the next edge to be detected (S11). This change in the DT setting results in the dead time td in FIG. 4 being reduced based on DT. The reduction of the dead time dt can be performed by delaying the timing at which the control signal changes to off or by speeding up the timing at which the control signal changes to on. In this embodiment, these can be controlled independently.

If it is not the case that $|Id|<I_0$ (S13: No), a through-current is flowing, and the dead time DT is increased by the predetermined time $\Delta T1$ by setting DT=DT+$\Delta T1$ (S15). The CPU 21 then waits for the next edge detection (S11). The increasing of the dead time td can be performed by speeding up the timing at which the control signal changes to off or by delaying the timing at which the control signal changes to on. In this embodiment, these can be controlled independently. When this setting is made, the dead time td in FIG. 4 is increased. It would be preferable to set the $\Delta T1$ so that is adequately larger than the $\Delta T0$ while not obstructing control. This reduces the number of through-currents.

Repeating this procedure provides the advantage of minimizing the dead time DT. This procedure can be implemented as follows.

For example, a counter can be inserted in the main routine, with the entire operation described above being performed at predetermined counter values so that the operation is performed at predetermined intervals. By doing this, the dead time setting can change in a short period of time, preventing frequent through-currents.

In particular, it would be preferable for a flag to be set if the through-current detection at S13 is No, so that the dead time reduction procedure at S14 is not executed for a predetermined time, with the procedure at S14 being executed after an adequate interval for detecting a through-current has elapsed. This allows the number of times there is flow of through-current to be reduced.

(Third Embodiment)

In contrast to the second embodiment, if a through-current is detected with a predetermined dead time setting, the CPU 21 serving as correcting means in a third embodiment does not reduce the dead time from the value used when the through-current was detected. With the second embodiment, through-current flows repeatedly. This is acceptable if the FETs have a high withstand voltage, but otherwise FET damage can result. For this reason, if a through-current is present, the dead time is not reduced from the dead time DT at the time of the through-current, thus increasing FET protection. Since the hardware structure and basic operations are similar to those of the first and the second embodiments, only correcting means will be described and other descriptions will be omitted.

Figure 8:
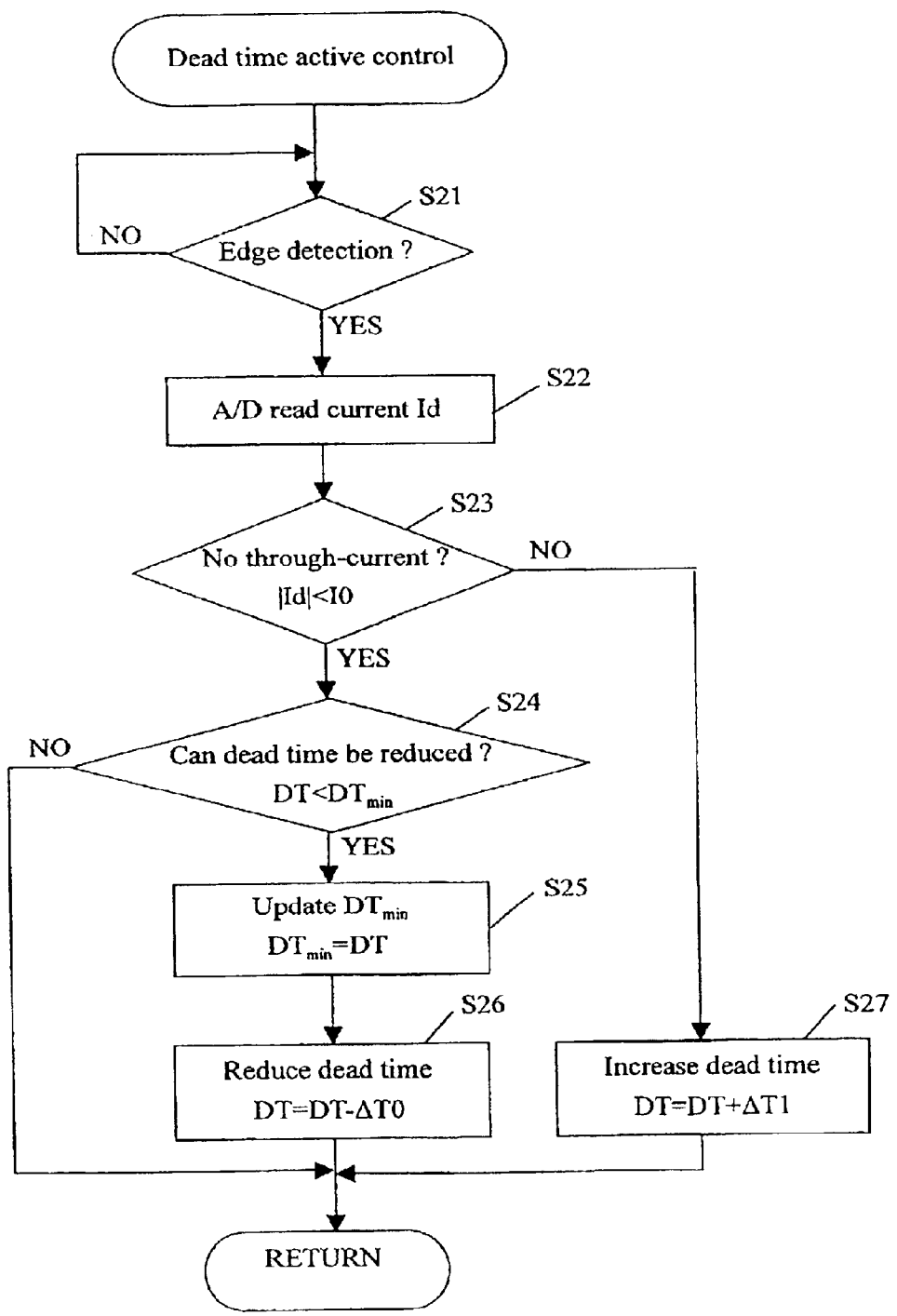
FIG. 8 is a flowchart showing a procedure for dead time active control performed by a CPU 21 serving as correcting means of a third embodiment.

FIG. 8 is a flowchart illustrating the dead time active control procedure of the CPU 21, which serves as correcting means, in the third embodiment. The dead time active control procedure will be described using this flowchart. This procedure is performed for each phase, so the U phase will be described and the descriptions for the other phases will be omitted. First, the CPU 21 uses the edge detection circuit 84U to wait for the trailing edge of the control signal UH from the high-level drive circuit 87 (S21). The detection of the trailing edge of the control signal UH at the timing tu shown in FIG. 4 (S21: Yes) is the start of the dead time td, so the A/D value of the current Id flowing through the U-phase circuit at this point is read (S22). This reading is performed with the shunt resistor RU, the operational amp AU, and the A/D converter 86U, and the result is stored in a predetermined region in the RAM 23.

Next, the current value $I_0$, which is a reference current set up ahead of time is called up from the ROM 22 and compared with the absolute value of the current value Id stored in the RAM 23. If $|Id|<I_0$ (S23: Yes), there is no through-current, so a dead time minimum DTmin set up ahead of time is compared with the current dead time DT to determine if the dead time DT can be reduced or not (S24). For example, if the initial value of the dead time minimum DTmin is DTmin=200 ns and the current dead time DT=100 ns, DT<DTmin (S24: Yes), so DTmin is updated (S25).

DTmin is set to DTmin=DT, so the value of DTmin becomes the current dead time $\Delta$DT=100 ns, and DTmin is updated to DTmin=100 ns. In this case, the dead time DT for which through-current flows is less than the current value, and the dead time is reduced by a predetermined time, e.g., 10 ns by setting DT=DT$-\Delta T0$, thus setting DT=90 ns (S26). Then, the operations from S21 are repeated (RETURN).

In this case, if there is no through-current (S23: Yes), the DT=90 ns and DTmin=100 at S24 and the dead time DT can be reduced (S24: Yes), so DTmin is updated to DTmin=90 ns (S25). DT is then reduced to DT=80 ns.

Assuming the actual lowest value for the dead time is 55 ns, as the DT is reduced repeatedly by S21 through S26, a through-current will flow at DT=50 ns. At this point, DT=50 ns and DTmin=60 ns. Since through-current is now flowing (S23: No), the dead time DT is increased by DT=DT+ΔT1 (S27). If the predetermined time is set to, e.g., ΔT1 =10 ns, DT will be DT=60 ns. To prevent through-current from flowing again, the relationship ΔT0<=ΔT1 must be in effect. If no other conditions change, setting DT to DT=60 ns will prevent a through-current (S23: Yes). Since DT=60 ns and DTmin=60 ns, DT<DTmin. Since ΔT0<=ΔT1 as described above, once through-current flows (S23: No), S24 will always be "No". Thus, once through-current flows, the dead time DT will not be reduced again by the procedure at S26.

We now assume that the actual dead time needed changes to 65 ns due to changes in conditions, e.g., changes over time or temperature changes. With the current DT=60 ns setting, through-current will flow again (S23: No). Dead time is then extended to DT=70 ns(S27). In this case, the setting DTmin=60 ns will not change, so DT<DTmin will not be satisfied at S24 (S24: No), and the dead time DT will not be reduced.

With the third embodiment described above, if control begins and there is through-current flow, there will be no subsequent through-current as long as conditions do not change. Also, the DT at that point is a fixed value. Also, if conditions change and through-current flows again, the dead time is immediately reset to a value that prevents through-current from flowing, and through-current will no longer flow as long as conditions do not change.

In the third embodiment, the dead time is minimized while minimizing the risk of through-current flow, thus providing the most effective protection for the FETs. As a result, damage to FETs is prevented even with relatively low withstand voltages.

The following changes may be implemented in the first through the third embodiments described above.

For example, the dead time settings in the above embodiments can be set and controlled indpendently for each phase or all three phases can be set and controlled together.

These embodiments described a motor control device 20 equipped with high-level FETs and low-stage FETs, but the circuit structure of the motor control device is not restricted to this. Also, the motor itself is not restricted to the embodiments and the present invention can be implemented for other types involving similar issues.

The FETs used as switching means are not restricted to power MOSFETs. Any type of FET for which the present invention can be implemented is acceptable.

Other modifications and improvements may be effected by someone skilled in the art without departing from the scope of the claims.

Also, the following inventions can be derived from the above embodiments.

A motor control device as described in claim 1 through claim 9 equipped with notifying means. Notifying means can be an LED, a buzzer, or the like. The motor control device having this structure provides the advantage of allowing irregularities to be discovered and recognized quickly.

As described above, the motor control device of the present invention allows through-currents during dead time to be discovered quickly even if dynamic changes due to temperature or age take place. Also, dead time values can be set actively to minimize dead time, thus improving motor efficiency and controllability while reducing noise.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A motor control device comprising:

high-stage FETs disposed on a power-supply side and low-stage FETs disposed on a ground side, said FETs being switching means connected in series in circuits disposed between an application point of a power supply and a ground point and associaicd with U, V, and W phases of a brushless DC motor, said FETs being selected in an exclusive manner;

connection points disposed between said high-level PETS and said low-stage FETs supplying drive currents to U-, V-, and W-phase motor coils based on combinations of open/close states of said high-level FETs and said low-stage FETs for each phase;

a current detecting means detecting currents in said circuits; and a switch controlling means controlling said switching means and driving said brushless DC motor;

means for detecting irregular current detecting current at a predetermined timing using said current detecting means; and means for evaluating motor drive circuit irregularities evaluating motor drive circuit irregularities based on current values detected by said irregular current detecting means.

2. A motor control device as described in claim 1 further comprising correcting means correcting a dead time setting based on a current value detected by said irregular current detecting means.

3. A motor control device as described in claim 1 wherein said irregular current detecting means detects a trailing edge when a gate signal for said U-, V-, or W-phase goes from on to off or a leading edge going from off to on and detects through current during a dead time for each phase with said current detecting means using said timing as a reference.

4. A motor control device as described in claim 1 wherein:

said cuerent detecting means is disposed so that currcnt flowing through said low-stage FETs is detected; and said irregular current detecting means detects when said controlling means is sending "on" gate signals to U- V-, and W-phase high-stage FETs while sending "off" gate signals to all low-stage FETs and detects through-current in said phases at said timing using said current detecting means.

5. A motor control device as described in claim 1 wherein:

said current detecting means is disposed so that current flowing through said low-stage FETs is detected, and said irregular current detecting means detects when said controlling means is sending "on" gate signals to U-, V-, and W-phase low-stage FETs while sending "off" gate signals to all high-stage FETs and detects through-current in said phases at said timing using said current detecting means.

6. A motor control device as described in claim 2 wherein, said correcting means reduces by a predetermined amount a dead time setting set up based on a turn-off dead time and a turn-on dead time set up ahead of time if a predetermined through current is not detected by said irregular current detecting means, and, if said predetermined through current is detected, said correcting means increases said dead time by a predetermined amount.

7. A motor control device as described in claim 6 wherein, if said through current is detected at a predetermined dead time value, said correcting means does not reduce said dead time below said dead time value at which said through-current was detected.

8. A motor control device as described in claim 6 wherein said controlling means sets dead time values independently for each of said phases.

9. A motor control device as described in claim 6 wherein said correcting means sets said dead time setting value independently for turn-off dead time and turn-on dead time.

10. A motor control device as described in claim 2 wherein said irregular current detecting means detects a trailing edge when a gate signal for said U-, V-, or W-phase goes from on to off or leading edge going from off to on and detects through current during a dead time for each phase with said current detecting means using said timing as a reference.

11. A motor control device as described in claim 3 wherein, said correcting means reduces by a predetermined amount a dead time setting set up based on a turn-off dead time and a (turn-on dead time set up ahead of time if a predetermined through-current is not detected by said irregular current detecting means, and, if said predetermined through-current is detected, said correcting means increases said dead time by a predetermined amount.

12. A motor control device as described in claim 7 wherein said controlling means sets dead time values independently for each of said phases.

13. A motor control device as described in claim 7 wherein said correcting means sets said dead time setting value independently for turn-off dead time and turn-on dead line.

14. A minor control device as described in claim 8 wherein said correcting means sets said dead time setting value independently for turn-off dead time and turn-on dead time.

15. A motor control device as described in claim 11 wherein said controlling means sets dead time values independently for each of said phases.

16. A motor control device as described in claim 11 wherein said correcting means sets said dead time setting value independently for turn-off dead time and turn-on dead time.

17. A motor control device as a described in claim 12 wherein said correcting means sets said dead time setting value independently for turn-off dead time and turn-on dead time.

* * * * *